(No Model.) 2 Sheets—Sheet 1.

O. J. COLTON.
CORN PLANTER.

No. 419,318. Patented Jan. 14, 1890.

Witnesses.
W. A. Olson
Abraham Anderson

Inventor:
Octavius J. Colton (No Model.) 2 Sheets—Sheet 2.
O. J. COLTON.
CORN PLANTER.
No. 419,318. Patented Jan. 14, 1890.
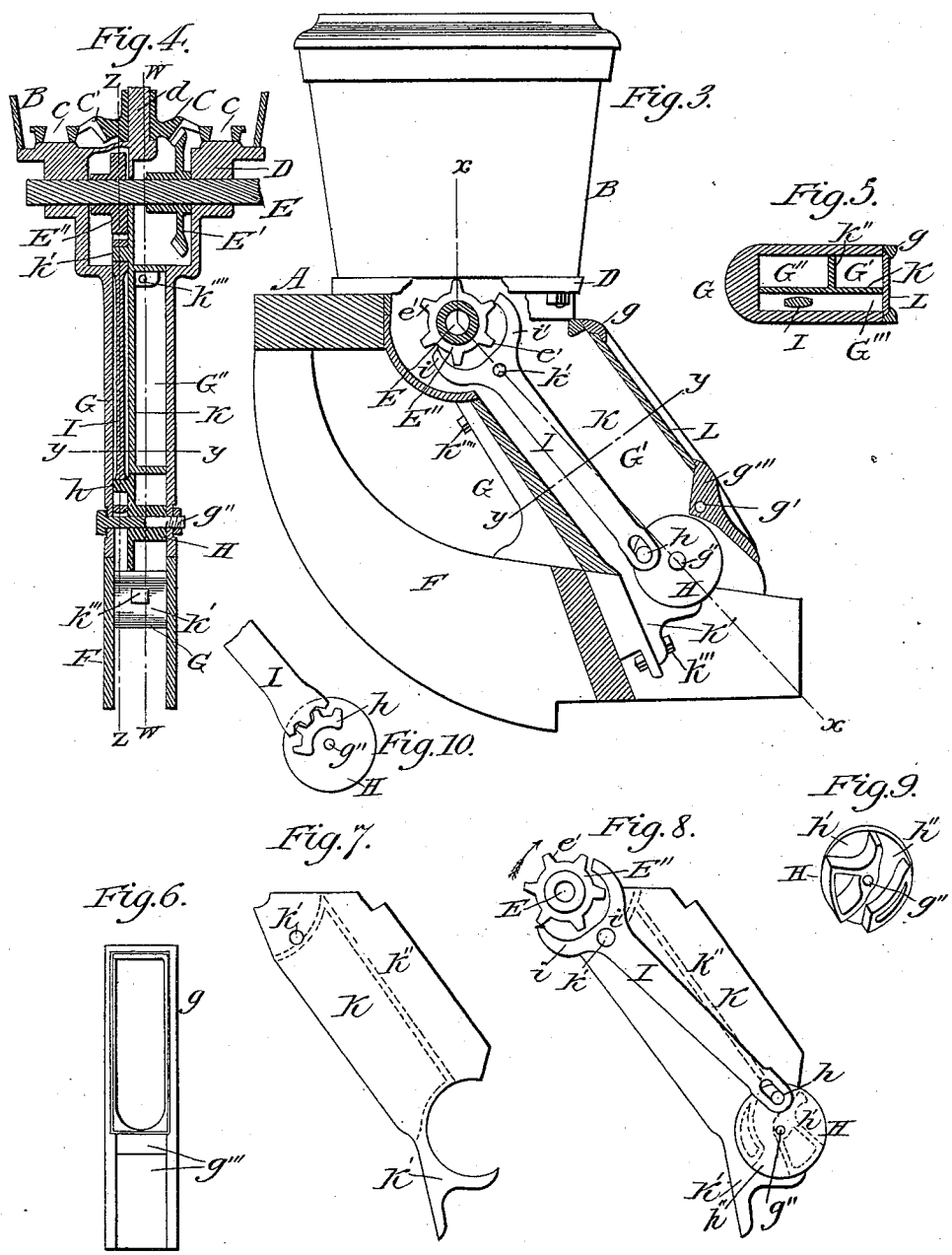
Witnesses.
M. Olson
Abraham Anderson
Inventor.
Octavus J. Colton

UNITED STATES PATENT OFFICE.

OCTAVIUS J. COLTON, OF GALESBURG, ILLINOIS.

CORN-PLANTER.

SPECIFICATION forming part of Letters Patent No. 419,318, dated January 14, 1890.

Application filed December 5, 1887. Serial No. 257,013. (No model.)

*To all whom it may concern:*

Be it known that I, OCTAVIUS J. COLTON, a citizen of the United States, residing at Galesburg, in the county of Knox and State of Illinois, have invented certain new and useful Improvements in Corn-Planters, which are fully set forth in the following specification.

My invention relates to that class of corn-planters intended for planting in check-rows, and more particularly to the manner and means of discharging the seed into the ground.

My improvements are fully set forth in the following specification, reference being had to the accompanying drawings, in which—

Figure 1:
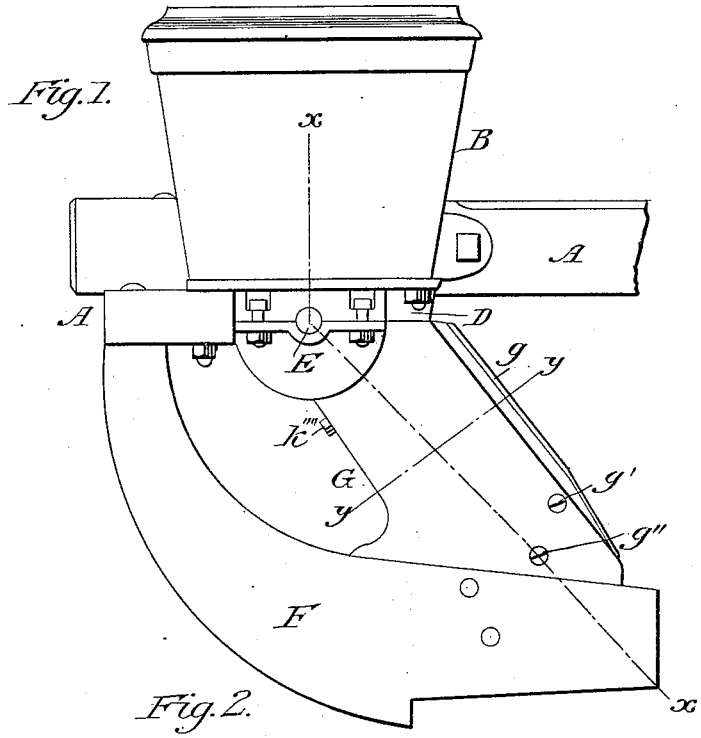
Figure 2:
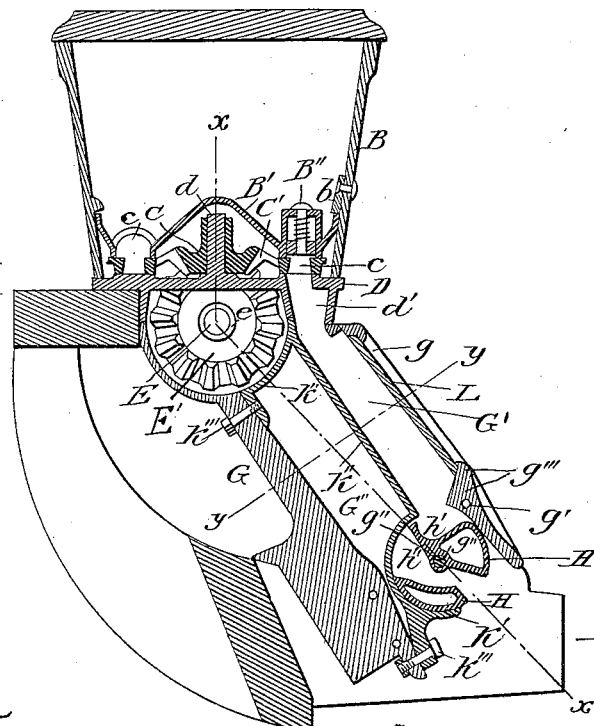

Figure 1 is a side elevation of part of a corn-planter suitable in form for the attachment of my improvements; Fig. 2, a sectional view of the same on the line $w\ w$ of Fig. 4; Fig. 3, a similar sectional view on the line $z\ z$ of Fig. 4; Fig. 4, a sectional view on the line $x\ x$ of Figs. 1, 2, and 3; Fig. 5, a sectional view on the line $y\ y$ of Figs. 1, 2, 3, and 4; and Figs. 6, 7, 8, 9, and 10 are detail views showing detached parts directly concerned in my invention, Fig. 6 showing an inside view of cover on back of seed-tube; Fig. 7, a view of a removable partition which forms the seed-passage and part of the valve-seat for the lower discharge-valve; Fig. 8, the devices employed for operating the lower discharge-valve; Fig. 9, an elevation of the lower discharge-valve, and Fig. 10 a modification of the device for operating said valve.

Like letters refer to like parts in all the figures of the drawings.

A A are parts of the frame of a corn-planter.

B is one of the seed-boxes. B' is the false bottom of same, and B'' the cut-off.

C is the rotary dropping-plate, having openings $c$ to receive and discharge the seed, and C' is the gear-wheel attached to said plate and by which it is moved.

D is the bottom of the seed-box B, bearing the journal $d$, on which plate C' revolves, and it also forms a bottom for the openings $c$ in the rotary plate, preventing the seed from dropping out of the said openings except at the exit-point $d'$, directly under the cut-off B''.

E is the intermittently-rotating shaft bearing the bevel-gear E', which acts upon the gear C' to set in motion the rotary dropping-plate C.

F is the furrow-opener or runner, and G is the leg or standard to which F is attached.

All of the foregoing parts and their relations and uses are shown and more fully described in my Letters Patent No. 349,836, granted September 28, 1886, and are shown and mentioned here as being of a form adapted to the application of my present improvements, which I will now proceed to set forth.

The standard G has lateral flanges, as shown in Figs. 4 and 5, extending backward from the main casting and forming a recess which extends from the opening $d'$ to the open space in the bifurcated runner F, making a continuous and free passage from $d'$ to the ground, except as hereinafter explained. In this recess in the standard G is placed the removable partition K, which, with its secondary partition $k''$, divides the said recess into the seed-passage proper G', continuous with $d'$, the useless space G'' and the chamber G''' containing the working parts, which are thus entirely separated from the seed-passage. The partition K, which is held firmly in place by suitable means, as the bolt $k'''$ and the screw $k''''$, bears the pivot $k'$, and also forms part of the valve-seat at K', as fully explained below. The backs of seed-passage G' and chamber G''' are closed by the glass L, held in place by the frame $g$. This frame $g$, being continued downward to cover the lower part of the recess, is attached to G by means of the bolt $g'$, passing through the flanges of G and through the extension $g'''$ of the frame and cover $g$. This extension $g'''$ fits between the flanges of G, and, in addition to the above office, also forms with K', already mentioned, the complete seat for the discharge-valve H, which is so placed and operated in the valve-seat thus formed as to receive at each stroke of the mechanism the seed dropped from one of the openings $c$ through the orifice $d'$ and seed-passage G', and at the same time discharge into the ground the seed received from the same source at the preceding stroke, as will be more particularly explained below. The valve H has a flange lying in the plane of the partition K and so formed and placed that the seed cannot pass from seed-passage G' into the chamber G''', but must pass into and be discharged by the valve H.

For the purpose of receiving and discharging the seed, the valve H is provided with a seed-cup $h'$ and a seed-passage $h''$, having their openings so placed on the periphery of valve H that when the opening of seed-cup $h'$ is in position to receive seed dropping from the passage G' the upper opening of passage $h''$ is closed by the upper part of valve-seat K', and the lower opening of passage $h''$ is open, so as to discharge the seed contained therein to the ground, as shown in Figs. 2 and 3, and at the next stroke of the mechanism the valve H is turned on its pivot $g''$ to the position shown in Fig. 8, the cup $h'$ being thrown past the valve-seat or cut-off $g'''$, so that the seed contained in it is discharged into the ground, and seed-passage $h''$ being so held that its upper opening coincides with seed-passage G', and the seed falling through G' drops into passage $h''$, and is stopped in its fall by the lower part of valve-seat K', which in this position closes the lower opening of passage $h''$. This position of valve H and its parts is fully shown in Fig. 8, dotted lines indicating the position of seed-cup $h'$ and passage $h''$. The two positions of valve H thus described are occupied alternately by valve H and its parts as the strokes of the operating mechanism continue, and this regular change of position may be secured by means of the mechanism shown in this application, or by any other means which will cause the position of valve H to be reversed at each stroke of the operating mechanism.

It now remains to describe the special device shown in the drawings for operating valve H. On the intermittently-rotating shaft E is placed and securely fastened a ratchet-wheel E'', having teeth $e'$, and a bifurcated lever I is placed in the chamber G''' on the pivot $k'$, which forms its fulcrum, and with its arms $i$ and $i'$ arranged in the path of the ratchet-teeth $e'$, and so adjusted as to be operated upon alternately by the said teeth, the number of which teeth (in this case six) is always one-half of the number of strokes required for one complete revolution of the shaft E. In Fig. 3 one of the teeth $e'$ is shown as being in contact with the arm $i'$, and the arm $i$ is shown as being in contact with a portion of the circumference of ratchet E'' between two of the teeth $e'$. This is one position of rest at the completion of a stroke. The other position of rest is shown in Fig. 8. These positions of rest follow alternate strokes of the operating mechanism, and lever I is held securely in each of these positions by the means shown and already partly described, one of its arms, either $i$ or $i'$, being in contact with the outer surface of one of the teeth $e'$, and the other arm being in contact with the part of ratchet-wheel E'' lying between two of the teeth $e'$. The manner in which the position of lever I is changed at each stroke will be understood when it is remembered that the ratchet-wheel E'' moves intermittently in the direction shown by arrow in Fig. 8, and that the extent of each stroke is equal to one-half the circumferential distance between any part of one of the teeth $e'$ and the corresponding part of one of the adjacent teeth, the teeth $e'$ being equally spaced. Starting now with the position shown in Fig. 3, at the next stroke of the operating mechanism the tooth $e'$, which is in contact with the arm $i'$, is moved away, releasing the said arm, and the tooth adjacent to and approaching the arm $i$ comes in contact therewith, pushes the lever I into the position shown in Fig. 8, and continues to move with ratchet E'', of which it is a part, for a short distance, with its outer surface passing the point of arm $i$, and stopping with the point of arm $i$ still in contact with said outer surface near the edge thereof. At the succeeding stroke the tooth $e'$, which is in contact with arm $i$, Fig. 8, is moved on releasing said arm, and the tooth which is adjacent to and approaching arm $i'$ comes in contact with it, pushes the lever I back into the position shown in Fig. 3, and continues to move with ratchet E'', of which it is a part, for a short distance, with its outer surface passing the point of arm $i'$, and stopping with said point still in contact with and held by said outer surface near the edge thereof. The intermittent motion of the ratchet E'' being continued, a positive intermittent reciprocating motion is thus imparted to the lever I, and each stroke is so made that the lever I is moved from one of its positions of rest to the other before the completion of the movement of the actuating mechanism, and is allowed to remain at rest during the remainder of said movement and until the next stroke of the operating mechanism. The gear E' on the shaft E, as already explained, imparts motion to the seed-plate C. This motion continues during the whole time occupied by each movement of the actuating mechanism, and it is during the latter portion of this time and after the lever I has been moved to its position of rest that an opening $c$ of plate C is caused to register with the orifice $d'$, allowing the seed which may be contained in said opening to drop through into the seed-passage G'.

The discharge-valve H has projecting into chamber G''' from its side contiguous thereto a crank-pin $h$, fitting into a slot in lever I, Fig. 3, or cogs to mesh into similar cogs on the end of lever I, Fig. 10; or any other suitable device may be used for transferring the reciprocating motion of lever I to the said discharge-valve and to stop the valve and hold it firmly in its proper position at the close of each movement of the lever I.

The operation of my device has been already set forth, but may be more connectedly described as follows: A check-wire being stretched across the field and secured at each end, the buttons or joints thereon, as the machine advances, are caused to come in contact with a check-rower lever, as is well understood, producing a vibrating motion of said lever, which, as is fully described in my Letters Patent No. 321,087, granted June 30, 1885, is transferred to the shaft E, and the parts attached thereto receive an intermittent rotary motion in one direction, and in the machine shown this motion turns the shaft one-twelfth of a revolution at each stroke. At each impulse thus given the plate C is caused to revolve, so that one of its openings c registers with the orifice d', and the seed contained in the opening c, which is thus brought over the orifice, drops through and falls along the passage G' until received by the valve H. At the same stroke the ratchet-wheel E'', moving with shaft E, operates on the lever I through its arms i or i', as the case may be, and the oscillating discharge-valve H is moved either from the position shown in Figs. 2 and 3 to that shown in Fig. 8, or vice versa. In the former case the seed contained in the cup h' (if any) is discharged into the ground, and the passage h'' is brought into and held in position to receive the seed from the seed-passage G', and when the valve H is next moved the seed contained in the passage h'' is discharged and the cup h' is brought into and held in position to receive seed. These movements of the valve H, being caused by and coincident with the movements of lever I, as already shown, are completed before the opening c of the plate C registers with the orifice d', and the seed-cup h' or passage h'', as the case may be, is thereby always in position to receive the seed before said seed is released from the seed-box B by the operation of plate C.

It is obvious that various mechanical modifications may be made in the construction and application of my device without departing from the principle of my invention; and I do not wish to be understood as limiting myself to the details herein set forth, as many such modifications may fairly be considered as coming within the scope of my invention.

Having thus described my invention, what I claim as new, and desire to secure by Letters Patent, is—

1. The combination of a recessed standard G with a removable partition K, having valve-seat K', substantially as and for the purposes described.

2. The combination, with a recessed standard G, having a removable partition K, of a cover g, provided with an extension g''', forming with K', attached to the partition K, a double seat or cut-off for an oscillating valve H, substantially as and for the purposes described.

3. The combination, with a ratchet-wheel E'', lever I, and valve H, of a removable partition K, having a valve-seat K', and a removable cover g, having valve-seat g''', substantially as and for the purposes described.

4. The combination, with a removable partition K, having valve-seat K', and a removable cover g, having valve-seat g''', of an oscillating discharge-valve H, substantially as and for the purposes described.

5. The combination, with an intermittently-rotating shaft E, provided with a bevel-gear E', to mesh with a bevel-gear C' on or attached to a rotary seed-plate C, of an oscillating double discharge-valve H and its actuating mechanism, constructed and arranged for operation substantially as and for the purpose herein set forth and described.

6. The combination, with the ratchet-wheel E'', of the bifurcated lever I, having its arms i and i' arranged in the path of the teeth e', and adapted to be actuated and held at rest by the wheel E'' and teeth e', substantially as and for the purposes described.

7. The ratchet-wheel E'', adapted to operate the reciprocating bifurcated lever I and provided with teeth e', having their outer surfaces arranged in combination with the arms i and i' of lever I, and adapted to permit the wheel E'' at each operative stroke to move the lever I in one direction and bring it to a position and state of rest somewhat before the completion of said operative stroke of wheel E'', substantially as and for the purposes herein set forth and described.

8. In a corn-planter provided with a rotary plate C, connected by gearing with and adapted to be operated by an intermittently-rotating shaft E, a driving ratchet-wheel E'', securely attached to said shaft, in combination with a bifurcated reciprocating lever I, adapted to be actuated by wheel E'' and to set in motion or hold at rest an oscillating valve H, substantially as and for the purposes described.

9. In a corn-planter provided with a rotary plate C, connected by gearing with and adapted to be operated by an intermittently-rotating shaft E, a discharge-valve H, arranged to receive and discharge separately each portion of seed that may be dropped from the seed-plate C, in combination with mechanism connecting valve H with shaft E, whereby at each operative stroke of shaft E the valve H will be moved in one direction and brought to and held in a state of rest somewhat before the completion of said operative stroke, substantially as and for the purposes herein set forth and described.

OCTAVIUS J. COLTON.

Witnesses:
W. A. OLSON,
ABRAHAM ANDERSON.